United States Patent
Zhang et al.

(10) Patent No.: US 10,178,240 B2
(45) Date of Patent: Jan. 8, 2019

(54) MULTI-CARD RESOURCE MANAGEMENT METHOD, DEVICE AND MULTI-CARD TERMINAL

(71) Applicant: ZTE CORPORATION, Guangdong (CN)

(72) Inventors: Diankai Zhang, Guangdong (CN); Lin Shen, Guangdong (CN); Guangcai Qu, Guangdong (CN); Chenyu Lei, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/739,275

(22) PCT Filed: May 27, 2016

(86) PCT No.: PCT/CN2016/083680
§ 371 (c)(1),
(2) Date: Dec. 22, 2017

(87) PCT Pub. No.: WO2016/206517
PCT Pub. Date: Dec. 29, 2016

(65) Prior Publication Data
US 2018/0191913 A1      Jul. 5, 2018

(30) Foreign Application Priority Data

Jun. 24, 2015   (CN) .......................... 2015 1 0353554

(51) Int. Cl.
*H04M 15/00*  (2006.01)
*H04W 36/22*  (2009.01)
*H04M 1/675*  (2006.01)
*H04W 36/34*  (2009.01)

(52) U.S. Cl.
CPC ......... *H04M 15/771* (2013.01); *H04M 1/675* (2013.01); *H04M 15/723* (2013.01); *H04M 15/7556* (2013.01); *H04M 15/887* (2013.01); *H04W 36/22* (2013.01); *H04W 36/34* (2013.01)

(58) Field of Classification Search
CPC ............. H04M 15/771; H04M 15/887; H04M 15/7556; H04M 1/675
USPC ................................................. 455/557, 558
See application file for complete search history.

(56) References Cited

U.S. PATENT DOCUMENTS

2013/0040618 A1* 2/2013 D'amato ........... H04M 1/72522
455/414.1
2013/0137484 A1* 5/2013 Torres .................. H04B 1/3816
455/558

* cited by examiner

*Primary Examiner* — Ayodeji Ayotunde
(74) *Attorney, Agent, or Firm* — Nath Goldberg & Meyer; Joshua B. Goldberg

(57) ABSTRACT

A multiple subscriber identity module cards (multi-SIM) resource management method, device and multi-SIM terminal. The method comprises: acquiring a subscriber identity module card list in a terminal, the subscriber identity module card list comprising all subscriber identity module cards in the terminal; and if a remaining quantity of a service resource on a subscriber identity module card currently used in the terminal is less than or equal to a preset remaining quantity threshold, then automatically switching to a subscriber identity module card having a sufficient service resource and in the subscriber identity module card list.

18 Claims, 2 Drawing Sheets

MULTI-CARD RESOURCE MANAGEMENT METHOD, DEVICE AND MULTI-CARD TERMINAL

This is a National Phase Application filed under 35 U.S.C. 371 as a national stage of PCT/CN2016/083680, filed May 27, 2016, an application claiming the benefit of Chinese Application No. 201510353554.4, filed Jun. 24, 2015, the content of each of which is hereby incorporated by reference in its entirety.

TECHNICAL FIELD

The present application relates to, but is not limited to, the field of communication technology, especially to a multi-card resource management method, a multi-card resource management device and a multi-card terminal.

BACKGROUND

Currently, smart terminals have become indispensable tools in people's work and life, and multi-standard, multi-card multi-standby terminals have become a trend. In existing multi-card terminals, resources for subscriber identity module (SIM) cards are independent of each other, and respective management applications perform management separately. Therefore, when a usage amount of a certain service resource for a certain SIM card reaches a limit, a user may be prompted to perform a manual switch by sending a message to the user, but intelligent management and scheduling may not be performed by taking other resources into account. As a result, user experience is relatively degraded.

SUMMARY

An overview of subject matters described in the present disclosure is provided below. The overview is not intended to limit the protection scope of the claims.

The present disclosure provides a multi-card resource management method, a multi-card resource management device and a multi-card terminal, which can solve the issue existing in related art that the multi-card resource management in the multi-card terminal may not be intelligent, thereby improving user experience.

A multi-card resource management method is provided, and the method includes: acquiring a subscriber identity module (SIM) card list in a terminal; and automatically switching to a SIM card, for which a service resource is sufficient, in the SIM card list, if a remaining amount of the service resource for a currently-used SIM card is less than or equal to a preset remaining amount threshold.

In embodiments of the present disclosure, automatically switching to the SIM card, for which the service resource is sufficient, in the SIM card list includes: inquiring whether or not at least one SIM card, for which the service resource is sufficient, exists in the SIM card list; and selecting and switching to one of the at least one SIM card for which the service resource is sufficient, if a result of the inquiring indicates that the at least one SIM card for which the service resource is sufficient exists in the SIM card list.

In embodiments of the present disclosure, inquiring whether or not the at least one SIM card, for which the service resource is sufficient, exists in the SIM card list includes any one of: inquiring other SIM cards in the SIM card list sequentially in an order from a SIM card having a highest usage priority to a SIM card having a lowest usage priority; the other SIM cards referring to SIM cards in the SIM card list excluding the SIM card for which the remaining amount of the service resource is less than or equal to the preset remaining amount threshold; and inquiring the other SIM cards in the SIM card list in an arbitrary order.

Selecting and switching to one of the at least one SIM card, for which the service resource is sufficient, includes any one of: selecting and switching to one SIM card having a highest usage priority among the at least one SIM card for which the service resource is sufficient; selecting, from the at least one SIM card for which the service resource is sufficient, a SIM card for which the service resource is first determined to be sufficient by the inquiring, and switching to the selected SIM card; and selecting and switching to one SIM card having a maximum remaining amount of the service resource among the at least one SIM card for which the service resource is sufficient.

In embodiments of the present disclosure, automatically switching to the SIM card, for which the service resource is sufficient, in the SIM card list further includes: prompting a user to perform a manual selection or automatically switching to a target SIM card preset by the user, if the result of the inquiring indicates that no SIM card for which the service resource is sufficient exists in the SIM card list.

In embodiments of the present disclosure, the method further includes determining whether or not the service resource for a SIM card is sufficient.

Determining whether or not the service resource for the SIM card is sufficient includes: determining whether or not a remaining amount of the service resource for the SIM card is greater than the preset remaining amount threshold; and determining that the service resource for the SIM card is sufficient, if the remaining amount of the service resource for the SIM card is greater than the preset remaining amount threshold.

In embodiments of the present disclosure, the service resource includes at least one of: minutes, data, texts, multimedia messages, and WIFI access time.

A multi-card resource management device is provided, and the device includes: a SIM card acquisition module configured to acquire a SIM card list in a terminal, the SIM card list including all SIM cards in the terminal; and a management module configured to automatically switch to a SIM card, for which a service resource is sufficient, in the SIM card list, if a remaining amount of the service resource for a currently-used SIM card is less than or equal to a preset remaining amount threshold.

In embodiments of the present disclosure, the management module includes an inquiring sub-module and a switching sub-module.

The inquiring sub-module may be configured to inquiry whether or not at least one SIM card for which the service resource is sufficient exists in the SIM card list.

The switching sub-module may be configured to select and switch to one of the at least one SIM card for which the service resource is sufficient, if an inquiry result obtained by the inquiring sub-module indicates that the at least one SIM card for which the service resource is sufficient exists in the SEM card list.

In embodiments of the present disclosure, the management module further includes a processing sub-module. The processing sub-module may be configured to prompt a user to perform a manual selection or automatically switch to a target SIM card preset by the user, if the inquiry result obtained by the inquiring sub-module indicates that no SIM card for which the service resource is sufficient exists in the SEM card list.

In embodiments of the present disclosure, the inquiring sub-module is configured to inquiry whether or not the at least one SIM card for which the service resource is sufficient exists in the SEM card list in any one of the following manners: 1) inquiring other SIM cards in the SIM card list sequentially in an order from a SIM card having a highest usage priority to a SIM card having a lowest usage priority; the other SIM cards referring to SIM cards in the SIM card list excluding the SIM card for which the remaining amount of the service resource is less than or equal to the preset remaining amount threshold; and 2) inquiring the other SEM cards in the SIM card list in an. arbitrary order.

The switching sub-module is configured to select and switch to one of the at least one SIM card for which the service resource is sufficient in any one of the following manners: 1) selecting and switching to one SIM card having a highest usage priority among the at least one SIM card for which the service resource is sufficient; 2) selecting, from the at least one SIM card for which the service resource is sufficient, a SIM card for which the service resource is first determined to be sufficient by the inquiring, and switching to the selected SIM card; and 3) selecting and switching to one SIM card having a maximum remaining amount of the service resource among the at least one SIM card for which the service resource is sufficient.

In embodiments of the present disclosure, the management module further includes a determination sub-module configured to determine whether or not the service resource for a SIM card is sufficient.

The determination sub-module is configured to determine whether or not the service resource for the SIM card is sufficient by determining whether or not a remaining amount of the service resource for the SIM card is greater than the preset remaining amount threshold, and determining that the service resource for the SIM card is sufficient if the remaining amount of the service resource for the SIM card is greater than the preset remaining amount threshold.

In embodiments of the present disclosure, the service resource includes at least one of: minutes, data, texts, multimedia messages, and WIFI access time.

A multi-card terminal is provided, and the multi-card terminal includes any one of the above multi-card resource management devices.

The present disclosure has the following beneficial effects.

In the implementations according to embodiments of the present disclosure, a SIM card list in a terminal is acquired, and the SIM card list includes all SIM cards in the terminal; switch is automatically made to a SIM card, for which a service resource is sufficient, in the SIM card list, if a remaining amount of the service resource for the SIM card currently used in the terminal is less than or equal to a preset remaining amount threshold. As such, a manual switch by a user is no longer needed, an intelligent management on the multi-card resources in the terminal is achieved, and user experience is largely improved.

DETAILED DESCRIPTION

Implementations of the present disclosure will be described below with reference to the accompanying drawings. It should be noted that embodiments and features in the embodiments described in the present disclosure can be combined with each other in arbitrary manners, unless a conflict exists.

Embodiment One

Figure 1:
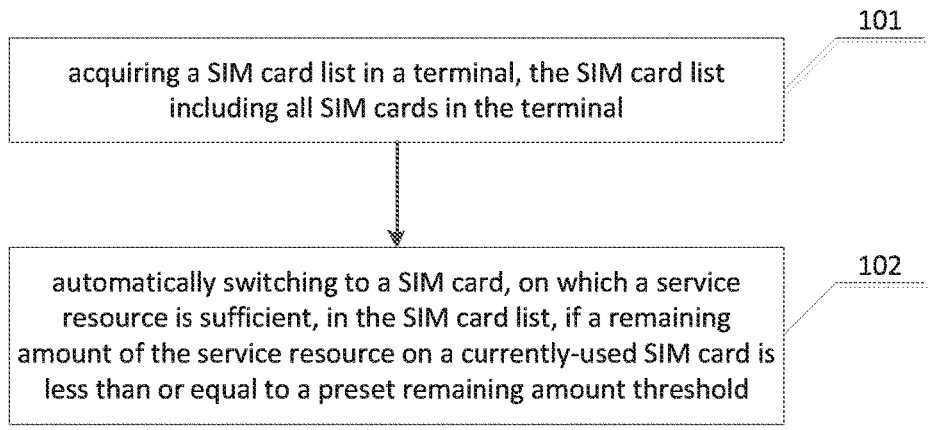
FIG. 1 is a flowchart of a multi-card resource management method according to Embodiment one of the present disclosure.

Referring to FIG. 1, the present embodiment provides a multi-card resource management method, and the method includes step 101 and step 102.

At step 101, a SIM card list in a terminal is acquired, the SIM card list including all SIM cards in the terminal.

At step 102, switch is automatically made to a SIM card, for which a service resource is sufficient, in the SIM card list, if a remaining amount of the service resource for a currently-used SIM card is less than or equal to a preset remaining amount threshold.

In embodiments of the present disclosure, when the service resource for one SIM card is insufficient, automatic switch is made to another SIM card, for which the service resource is sufficient, in the SIM card list. As such, a manual switch by a user is no longer needed, a more intelligent management is achieved, and user experience is largely improved.

In embodiments of the present disclosure, remaining amount thresholds of different service resources for different SIM cards may be different; and remaining amount thresholds of a same service resource for different SIM cards may be identical or may be different.

In embodiments of the present disclosure, the service resource includes but is not limited to at least one of: minutes, data, texts, multimedia messages, WIFI access time, etc. For example, two different service resources of the minutes and the data for one SIM card correspond to different remaining amount thresholds; and the remaining amount thresholds of the minutes for two different SIM cards may be set to be identical to each other, or may be set to be different from each other. Moreover, the remaining amount threshold in embodiments of the present disclosure may be flexibly set according to practical needs. For example, the remaining amount threshold may be set to a value larger than 0, or may be directly set to 0.

In embodiments of the present disclosure, determining whether or not a service resource for a SIM card is sufficient includes: determining whether or not a remaining amount of the service resource for the SIM card is greater than the preset remaining amount threshold; and determining that the service resource for the SIM card is sufficient if the remaining amount of the service resource for the SIM card is greater than the preset remaining amount threshold.

Figure 2:
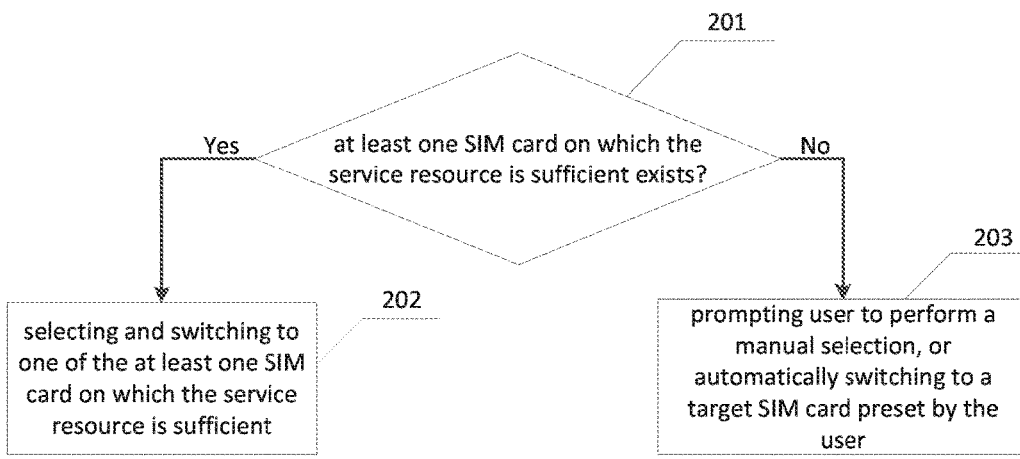
FIG. 2 is a flowchart of a process of automatically switching to another SIM card according to Embodiment one of the present disclosure.

In embodiments of the present disclosure, in above step 102, a process of automatically switching to another SIM card, for which the service resource is sufficient, in the SIM card list is shown in FIG. 2, and includes steps 201 to 203.

At step 201, whether or not at least one SIM card for which the service resource is sufficient exists in the SIM card list is inquired, and if a result of the inquiry indicates that at least one SIM card for which the service resource is sufficient exists, the process proceeds to step 202; otherwise, the process proceeds to step 203.

At step 202, one SIM card is selected from the at least one SIM card for which the service resource is sufficient and switch is made to the selected one SIM.

At step 203, it indicates, at this point, that the service resource for all SIM cards in the terminal has been used up; and in this case, the user is prompted to perform a manual selection, or, switch is automatically made to a target SIM card preset by the user.

In embodiments of the present disclosure, the method further includes determining whether or not the service resource for the SIM card is sufficient.

Determining whether or not the service resource for the SIM card is sufficient includes: determining whether or not a remaining amount of the service resource for the SIM card is greater than the preset remaining amount threshold, and determining that the service resource for the SIM card is sufficient if the remaining amount of the service resource for the SIM card is greater than the preset remaining amount threshold.

In embodiments of the present disclosure, step 201 of inquiring whether or not at least one SIM card for which the service resource is sufficient exists in the SIM card list may be implemented in any one of the following Inquiry Manner I and Inquiry Manner II.

Inquiry Manner I

Other SIM cards in the SIM card list are sequentially inquired in an order from a SIM card having a highest usage priority to a SIM card having a lowest usage priority; and the phrase "other SIM cards" refers to SIM cards in the SIM card list excluding the SIM card for which the remaining amount of the service resource is less than or equal to the preset remaining amount threshold. In this case, the usage priority of each of the SIM cards may be preset by the user, an inquiry process may be performed on the SIM cards one by one, and the inquiry process may be terminated once one SIM card for which the service resource is sufficient is obtained.

Inquiry Manner II

The other SIM cards in the SIM card list are inquired in an arbitrary order. The arbitrary order may be a random order, or may be any other order such as an order from a highest usage priority to a lowest usage priority, an order from a lowest usage priority to a highest usage priority, or the like. In this case, the inquiry process may be performed on all remaining SIM cards.

In embodiments of the present disclosure, step 202 of selecting and switching to one of the at least one SIM card for which the service resource is sufficient may be implemented in any one of the following Selection Manner I, Selection Manner II and Selection Manner III.

Selection Manner I

When the inquiry process is performed in the above-described Inquiry Manner I, a SIM card having a highest usage priority among the SIM cards for each of which the service resource is sufficient is selected and switch is made to the selected SIM card. In this case, because the inquiry process is performed sequentially in an order from a SIM card having a highest usage priority to a SIM card having a lowest usage priority, the SIM card for which the service resource is first determined to be sufficient in the inquiry process is the SIM card having the highest priority among the SIM cards for each of which the service resource is sufficient. Moreover, it should be understood that, in the present embodiment, the SIM card having the highest usage priority is selected to be used at first in initial usage. The rule of setting the usage priorities may be set by the user according to factors such as a usage frequency of each SIM card and an amount of the service resource for each SIM card.

Selection Manner II

When the inquiry process is performed in the above-described Inquiry Manner II, a SIM card for which the service resource is first determined to be sufficient in the inquiry process is selected from all of the inquired SIM cards for each of which the service resource is sufficient.

Selection Manner III

When the inquiry process is performed in the above-described. Inquiry Manner II, a SIM card having a maximum remaining amount of the service resource may be selected from all of the inquired SIM cards for each of which the service resource is sufficient.

In embodiments of the present disclosure, when the service is a periodically cleared service, such as a monthly service, all of the usage statuses may be cleared at the beginning of each month, and in this case, the SIM card having the highest usage priority is used when the terminal is restored back to an initial state.

Embodiment Two

Figure 3:
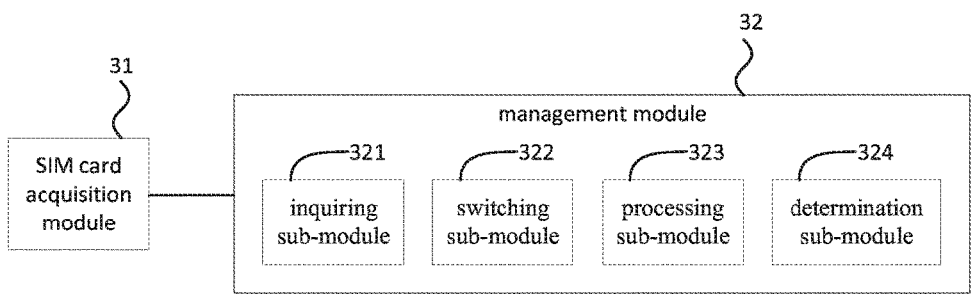
FIG. 3 is a schematic diagram illustrating a structure of a multi-card resource management device according to Embodiment two of the present disclosure.

The embodiment of the present disclosure provides a multi-card resource management device, and as shown in FIG. 3, the device includes: a SIM card acquisition module 31, which is configured to acquire a SIM card list in a terminal, the SIM card list including all SIM cards in the terminal; and a management module 32, which is configured to automatically switch to a SIM card, for which a service resource is sufficient, in the SIM card list, if a remaining amount of the service resource for a currently-used SIM card is less than or equal to a preset remaining amount threshold.

In embodiments of the present disclosure, it should be understood, that remaining amount thresholds of different service resources for different SIM cards may be identical or may be different, and remaining amount thresholds of a same service resource for different SIM cards may be identical or may be different. In embodiments of the present disclosure, the service resource includes but is not limited to at least one of: minutes, data, texts, multimedia messages, WIFI access time, etc. For example, two different service resources of the minutes and the data on one SIM card correspond to different remaining amount thresholds; and the remaining amount thresholds of the minutes on two different SIM cards may be set to be identical to each other, or may be set to be different from each other. Moreover, in embodiments of the present disclosure, the remaining amount threshold may be flexibly set according to practical needs. For example, the remaining amount threshold may be set to a value larger than 0, or may be directly set to 0. In the present embodiment, determining whether or not a service resource for a SIM card is sufficient includes: determining whether or not a remaining amount of the service resource for the SIM card is greater than the preset remaining amount threshold; and determining that the service resource for the SIM card is sufficient if the remaining amount of the service resource for the SIM card is greater than the preset remaining amount threshold.

In embodiments of the present disclosure, the management module 32 includes an inquiring sub-module 321, a switching sub-module 322 and a processing sub-module 323.

The inquiring sub-module 321 may be configured to inquiry whether or not at least one SIM card for which the service resource is sufficient exists in the SIM card list.

The switching sub-module 322 may be configured to select and switch to one of the at least one SIM card for which the service resource is sufficient, if an inquiry result obtained by the inquiring sub-module 321 indicates that the at least one SIM card for which the service resource is sufficient exists in the SIM card list.

The processing sub-module 323 may be configured to prompt a user to perform a manual selection or automatically switch to a target SIM card preset by the user, if the inquiry result obtained by the inquiring sub-module 321 indicates that the SIM card for which the service resource is sufficient does not exist in the SIM card list, the target SIM card being preset by the user.

In embodiments of the present disclosure, the inquiring sub-module 321 may be configured to inquiry whether or not the at least one SIM card for which the service resource is sufficient exists in the SIM card list in any one of the following Inquiry Manner I and Inquiry Manner II.

Inquiry Manner I

Other SIM cards in the SIM card list are sequentially inquired in an order from a SIM card having a highest usage priority to a SIM card having a lowest usage priority; and the phrase "other SIM cards" refers to SIM cards in the SIM card list excluding the SIM card for which the remaining amount of the service resource is less than or equal to the preset remaining amount threshold. In this case, the usage priority of each of the SIM cards may be preset by the user, an inquiry process may be performed on the SIM cards one by one, and the inquiry process may be terminated once one SIM card for which the service resource is sufficient is obtained.

Inquiry Manner II

The other SIM cards in the SIM card list are inquired in an arbitrary order. The arbitrary order may be a random order, or may be any other order such as an order from a highest usage priority to a lowest usage priority, an order from a lowest usage priority to a highest usage priority, or the like. In this case, the inquiry process may be performed on all remaining SIM cards.

In embodiments of the present disclosure, the switching sub-module 322 may be configured to select and switch to one of the at least one SIM card for which the service resource is sufficient in any one of the following Selection Manner I, Selection Manner II and Selection Manner III.

Selection Manner I

When the inquiry process is performed by the inquiring sub-module 321 in the above-described Inquiry Manner I, a SIM card having a highest usage priority among the SIM cards for each of which the service resource is sufficient is selected and switch is made to the selected SIM card. In this case, because the inquiry process is performed sequentially in an order from a SIM card having a highest usage priority to a SIM card having a lowest usage priority, the SIM card for which the service resource is first determined to be sufficient in the inquiry process is the SIM card having the highest priority among the SIM cards for each of which the service resource is sufficient. Moreover, it should be understood that, in the present embodiment, the SIM card having the highest usage priority is selected to be used at first in initial usage. The rule of setting the usage priorities may be set by the user according to factors such as a usage frequency of each SIM card and an amount of the service resource for each SIM card.

Selection Manner II

When the inquiry process is performed by the inquiring sub-module 321 in the above-described Inquiry Manner II, a SIM card for which the service resource is first determined to be sufficient in the inquiry process may be selected from all of the inquired. SIM cards for each of which the service resource is sufficient.

Selection Manner III

When the inquiry process is performed by the inquiring sub-module 321 in the above-described Inquiry Manner II, it is also possible to select and switch to a SIM card having a maximum remaining amount of the service resource among all of the inquired SIM cards for each of which the service resource is sufficient.

In embodiments of the present disclosure, when the service is a periodically cleared service, such as a monthly service, all of the usage statuses may be cleared at the beginning of each month, and in this case, the SIM card having the highest usage priority is used when the terminal is restored back to an initial state.

It should be understood that, the modules of the multi-card resource management device in the present embodiment may be implemented by software, hardware or a combination of software and hardware. The multi-card resource management device may be provided in a multi-card terminal, or may be provided independently of a multi-card terminal.

In embodiments of the present disclosure, the inquiring sub-module 321 is configured to inquiry whether or not the at least one SIM card for which the service resource is sufficient exists in the SIM card list in any one of the following manners: 1) inquiring other SIM cards in the SIM card list sequentially in an order from a SIM card having a highest usage priority to a SIM card having a lowest usage priority; where the phrase "other SIM cards" refer to SIM cards in the SIM card list excluding the SIM card for which the remaining amount of the service resource is less than or equal to the preset remaining amount threshold; and 2) inquiring the other SIM cards in the SIM card list in an arbitrary order.

In embodiments of the present disclosure, the switching sub-module 322 is configured to select and switch to one of the at least one SIM card for which the service resource is sufficient in any one of the following manners: 1) selecting and switching to one SIM card having a highest usage priority among the at least one SIM card for which the service resource is sufficient; 2) selecting one SIM card for which the service resource is first determined to be sufficient from the at least one SIM card for which the service resource is sufficient, and switching to the selected SIM card; and 3) selecting and switching to one SIM card having a maximum remaining amount of the service resource among the at least one SIM card for which the service resource is sufficient.

In embodiments of the present disclosure, the management module 32 further includes a determination sub-module 324. The determination sub-module 324 may be configured to determine whether or not the service resource for the SIM card is sufficient.

The determination sub-module 324 may determine whether or not the service resource for the SIM card is sufficient by determining whether or not a remaining amount of the service resource for the SIM card is greater than the preset remaining amount threshold, and determining that the service resource for the SIM card is sufficient if the remaining amount of the service resource for the SIM card is greater than the preset remaining amount threshold.

Embodiment Three

Description will be given below by taking a case where the terminal is a mobile phone as an example. The mobile phone has three SIM cards, and the service resources include minutes and data, and settings of respective calling priorities, data priorities, minutes limit and data limit of the SIM cards are shown in Table 1.

TABLE 1

| | Minutes quota | Calling priority | Data quota | Data priority |
|---|---|---|---|---|
| Card 1 | TT1 | 1 | DT1 | 2 |
| Card 2 | TT2 | 2 | DT2 | 1 |
| Card 3 | TT3 | 3 | DT3 | 3 |

Figure 4:
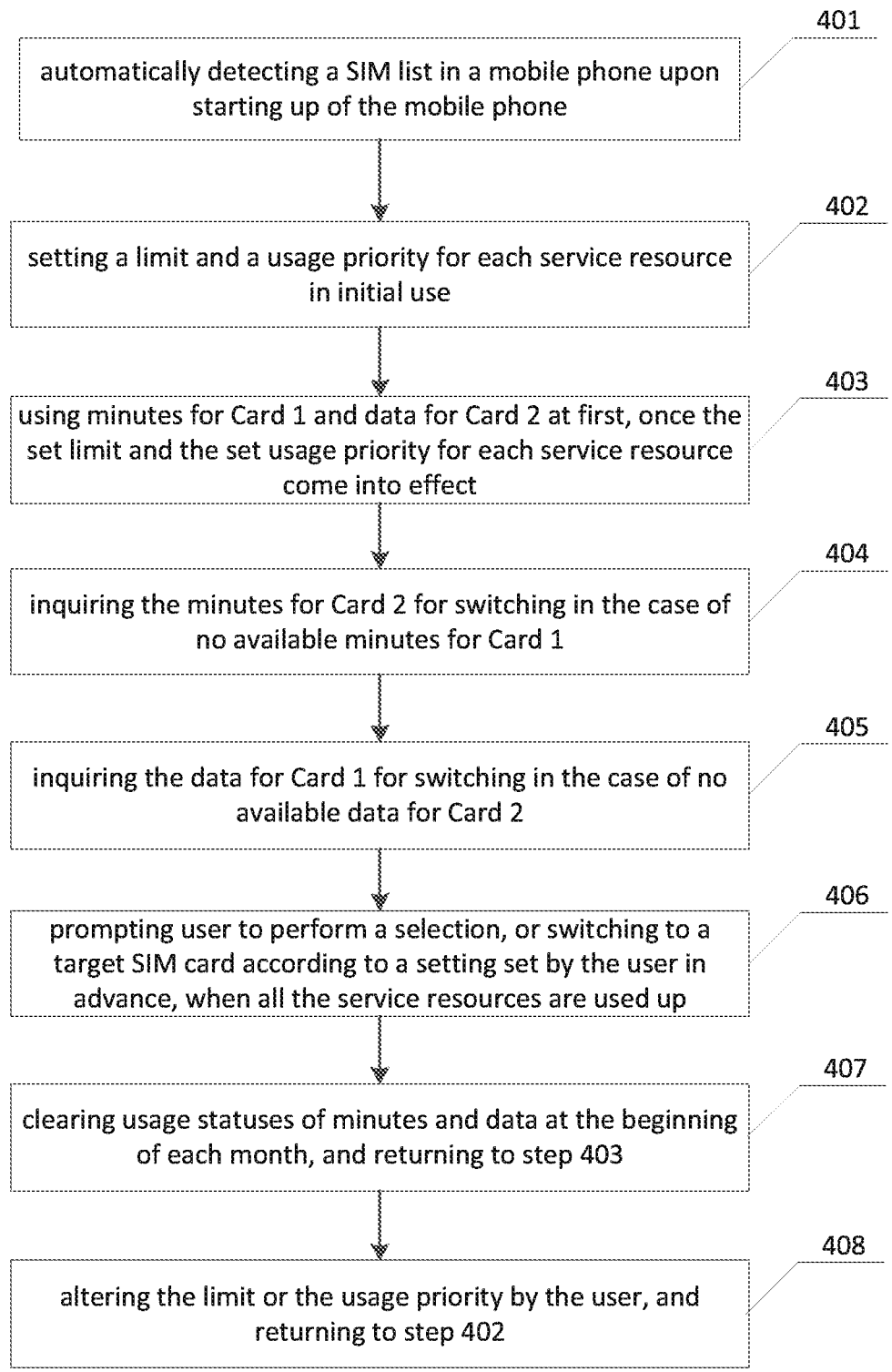
FIG. 4 is a flowchart illustrating a multi-card resource management method according to Embodiment three of the present disclosure.

Based on the settings in Table 1, a process of managing the resources for the three SIM cards in the mobile phone is shown in FIG. 4, and includes the following steps 401 to 408.

At step 401, a SIM card list in the mobile phone is automatically detected upon starting up of the mobile phone.

At step 402, a limit and a usage priority are set for each service resource in an initial use of the mobile phone, and a result of the setting is as shown in Table 1. The limit of the service resource may be set manually, or may be obtained by directly inquiring the operator.

At step 403, once the set limit and the set usage priority for each service resource come into effect, the minutes for Card 1 and the data for Card 2 are used at first, because their usage priorities are the highest.

At step 404, when the used minutes for Card 1 reaches a preset limit TT1, Card 2 having a second highest usage priority is automatically inquired to check whether or not Card 2 has available minutes. If Card 2 has available minutes, then switch is automatically made from Card 1 to Card 2; and if Card 2 has no available minutes, Card 3 is inquired. If the preset limit is reached in the middle of a call, it is also possible to prompt the user to select to either continue the call or switch to another card.

At step 405, similarly, when the used data on Card 2 reaches a preset limit DT2, Card 1 is automatically inquired to check whether or not Card 1 has available data. If the Card 1 has available data, switch is automatically made from Card 2 to Card 1; and if Card 1 has no available data, Card 3 is inquired. The same rule applies to other service resources.

At step 406, when data or minutes on all of the Cards 1, 2 and 3 are all used up, the user may be prompted to perform a selection on the SIM cards, or switch may be made to a target SIM card, according to a setting set by the user in advance. The target SIM card may be a SIM card that is most frequently used by the user or a SIM card with the cheapest fares.

At step 407, the usage statuses of the minutes and the data for all the cards are cleared at the beginning of each month, and the process returns to step 403.

At step 408, the user may alter the limit or the usage priority, and the process returns to step 402.

According to embodiments of the present disclosure, the management of the multi-card resources can be a comprehensive intelligent management by taking service resources for multiple SIM cards into account. As such, a frequent manual switch by a user is no longer needed, and user experience can be largely improved.

One of ordinary skill in the art can understand that all or part of steps in the above-mentioned embodiments may be implemented by using a computer program process, the computer program may be stored in a computer-readable storage medium and executed on a corresponding hardware platform (e.g., a system, equipment, an apparatus, a device, etc.), and when the computer program is executed, one of the steps or a combination of the steps in the method embodiments may be implemented.

In embodiments of the present disclosure, all or part of steps in the above-mentioned embodiments may also be implemented by using an integrated circuit, and these steps may be respectively implemented in integrated circuit modules, or some steps among these steps may he implemented in a single integrated circuit module.

Devices/function modules/function units in the above-mentioned embodiments may be implemented by using a general-purpose computing device, and may be integrated on a single computing device or distributed on a network consisting of a plurality of computing devices.

When implemented in the form of software function module and sold or used as independent products, the devices/function modules/function units in the above-mentioned embodiments may be stored in a computer-readable storage medium. The above-mentioned computer-readable storage medium may be a read-only memory, a magnetic disk, a compact disk or the like.

INDUSTRIAL APPLICABILITY

In the implementations according to embodiments of the present disclosure, a SIM card list in a terminal is acquired, and the SIM card list includes all SIM cards in the terminal; switch is automatically made to a SIM card, for which a service resource is sufficient, in the SIM card list, if a remaining amount of the service resource for the SIM card currently used in the terminal is less than or equal to a preset remaining amount threshold. As such, a manual switch by a user is no longer needed, an intelligent management on the multi-card resources in the terminal is achieved, and user experience is largely improved.

What is claimed is:

1. A multi-card resource management method, comprising:
   acquiring a subscriber identity module (SIM) card list in a terminal; and
   automatically switching to a SIM card, for which a service resource is sufficient, in the SIM card list, if a remaining amount of the service resource for a currently-used SIM card is less than or equal to a preset remaining amount threshold.

2. The multi-card resource management method of claim 1, wherein automatically switching to the SIM card, for which the service resource is sufficient, in the SIM card list comprises:
   inquiring whether or not at least one SIM card for which the service resource is sufficient exists in the SIM card list; and
   selecting one SIM card from the at least one SIM card for which the service resource is sufficient if a result of the inquiring indicates that the at least one SIM card for which the service resource is sufficient exists in the SIM card list, and switching to the selected SIM card.

3. The multi-card resource management method of claim 2, wherein:
   inquiring whether or not the at least one SIM card for which the service resource is sufficient exists in the SIM card list comprises any one of:
      inquiring other SIM cards in the SIM card list sequentially in an order from a SIM card having a highest usage priority to a SIM card having a lowest usage priority, wherein the other SIM cards refer to SIM cards in the SIM card list excluding the SIM card for which a remaining amount of the service resource is less than or equal to the preset remaining amount threshold; and inquiring the other SIM cards in the SIM card list in an arbitrary order; and selecting one SIM card from the at least one SIM card for which the service resource is sufficient and switching to the selected SIM card comprise any one of:

selecting and switching to one SIM card having a highest usage priority among the at least one SIM card for which the service resource is sufficient;

selecting, from the at least one SIM card for which the service resource is sufficient, a SIM card for which the service resource is first determined to be sufficient by the inquiring, and switching to the selected SIM card; and selecting and switching to one SIM card having a maximum remaining amount of the service resource among the at least one SIM card for which the service resource is sufficient.

4. The multi-card resource management method of claim 2, wherein automatically switching to the SIM card, for which the service resource is sufficient, in the SIM card list further comprises:

prompting a user to perform a manual selection or automatically switching to a target SIM card preset by the user, if the result of the inquiring indicates that no SIM card for which the service resource is sufficient exists in the SIM card list.

5. The multi-card resource management method of claim 1, further comprising determining whether or not the service resource for a SIM card is sufficient;

wherein determining whether or not the service resource for the SIM card is sufficient comprises:

determining whether or not a remaining amount of the service resource for the SIM card is greater than the preset remaining amount threshold; and determining that the service resource for the SIM card is sufficient, if the remaining amount of the service resource for the SIM card is greater than the preset remaining amount threshold.

6. The multi-card resource management method of claim 1, wherein the service resource comprises at least one of: minutes, data, texts, multimedia messages, and WIFI access time.

7. A multi-card resource management device, comprising:

a subscriber identity module (SIM) card acquisition module, which is configured to acquire a SIM card list in a terminal, the SIM card list comprising all SIM cards in the terminal; and a management module, which is configured to automatically switch to a SIM card, for which a service resource is sufficient, in the SIM card list, if a remaining amount of the service resource for a currently-used SIM card is less than or equal to a preset remaining amount threshold.

8. The multi-card resource management device of claim 7, wherein the management module comprises an inquiring sub-module and a switching sub-module;

the inquiring sub-module is configured to inquiry whether or not at least one SIM card for which the service resource is sufficient exists in the SIM card list; and the switching sub-module is configured to select and switch to one of the at least one SIM card for which the service resource is sufficient, if an inquiry result obtained by the inquiring sub-module indicates that the at least one SIM card for which the service resource is sufficient exists in the SIM card list.

9. The multi-card resource management device of Claim 8, wherein:

the inquiring sub-module is configured to inquiry whether or not the at least one SIM card for which the service resource is sufficient exists in the SIM card list in any one of the following manners:

inquiring other SIM cards in the SIM card list sequentially in an order from a SIM card having a highest usage priority to a SIM card having a lowest usage priority, wherein the other SIM cards refer to SIM cards in the SIM card list excluding the SIM card for which the remaining amount of the service resource is less than or equal to the preset remaining amount threshold; and inquiring the other SIM cards in the SIM card list in an arbitrary order; and the switching sub-module is configured to select and switch to one of the at least one SIM card for which the service resource is sufficient in any one of the following manners:

selecting and switching to one SIM card having a highest usage priority among the at least one SIM card for which the service resource is sufficient;

selecting, from the at least one SIM card for which the service resource is sufficient, a SIM card for which the service resource is first determined to be sufficient by the inquiring, and switching to the selected SIM card; and selecting and switching to one SIM card having a maximum remaining amount of the service resource among the at least one SIM card for which the service resource is sufficient.

10. The multi-card resource management device of claim 8, wherein the management module further comprises a determination sub-module;

the determination sub-module is configured to determine whether or not the service resource for a SIM card is sufficient; and the determination sub-module is configured to determine whether or not the service resource for the SIM card is sufficient by determining whether or not a remaining amount of the service resource for the SIM card is greater than the preset remaining amount threshold, and determining that the service resource for the SIM card is sufficient if the remaining amount of the service resource for the SIM card is greater than the preset remaining amount threshold.

11. The multi-card resource management device of claim 8, wherein the management module further comprises a processing sub-module, which is configured to prompt a user to perform a manual selection or automatically switch to a target SIM card preset by the user, if the inquiry result obtained by the inquiring sub-module indicates that no SIM card for which the service resource is sufficient exists in the SIM card list.

12. The multi-card resource management device of claim 7, wherein the service resource comprises at least one of: minutes, data, texts, multimedia messages, and WIFI access time.

13. A multi-card terminal, comprising a multi-card resource management device, comprising:

a subscriber identity module (SIM) card acquisition module, which is configured to acquire a SIM card list in a terminal, the SIM card list comprising all SIM cards in the terminal; and a management module, which is configured to automatically switch to a SIM card, for which a service resource is sufficient, in the SIM card list, if a remaining amount of the service resource for a currently-used SIM card is less than or equal to a preset remaining amount threshold.

14. The multi-card terminal of claim 13, wherein the management module comprises an inquiring sub-module and a switching sub-module;
the inquiring sub-module is configured to inquiry whether or not at least one SIM card for which the service resource is sufficient exists in the SIM card list; and
the switching sub-module is configured to select and switch to one of the at least one SIM card for which the service resource is sufficient, if an inquiry result obtained by the inquiring sub-module indicates that the at least one SIM card for which the service resource is sufficient exists in the SIM card list.

15. The multi-card terminal of claim 14, wherein:
the inquiring sub-module is configured to inquiry whether or not the at least one SIM card for which the service resource is sufficient exists in the SIM card list in any one of the following manners:
  inquiring other SIM cards in the SIM card list sequentially in an order from a SIM card having a highest usage priority to a SIM card having a lowest usage priority, wherein the other SIM cards refer to SIM cards in the SIM card list excluding the SIM card for which the remaining amount of the service resource is less than or equal to the preset remaining amount threshold; and
  inquiring the other SIM cards in the SIM card list in an arbitrary order; and
the switching sub-module is configured to select and switch to one of the at least one SIM card for which the service resource is sufficient in any one of the following manners:
  selecting and switching to one SIM card having a highest usage priority among the at least one SIM card for which the service resource is sufficient;
  selecting, from the at least one SIM card for which the service resource is sufficient, a SIM card for which the service resource is first determined to be sufficient by the inquiring, and switching to the selected SIM card; and
  selecting and switching to one SIM card having a maximum remaining amount of the service resource among the at least one SIM card for which the service resource is sufficient.

16. The multi-card terminal of claim 14, wherein the management module further comprises a determination sub-module;
the determination sub-module is configured to determine whether or not the service resource for a SIM card is sufficient; and
the determination sub-module is configured to determine whether or not the service resource for the SIM card is sufficient by determining whether or not a remaining amount of the service resource for the SIM card is greater than the preset remaining amount threshold, and determining that the service resource for the SIM card is sufficient if the remaining amount of the service resource for the SIM card is greater than the preset remaining amount threshold.

17. The multi-card terminal of claim 14, wherein the management module further comprises a processing sub-module, which is configured to prompt a user to perform a manual selection or automatically switch to a target SIM card preset by the user, if the inquiry result obtained by the inquiring sub-module indicates that no SIM card for which the service resource is sufficient exists in the SIM card list.

18. The multi-card terminal of claim 13, wherein the service resource comprises at least one of: minutes, data, texts, multimedia messages, and WIFI access time.

* * * * *